United States Patent
Miyake et al.

(10) Patent No.: US 7,518,081 B2
(45) Date of Patent: Apr. 14, 2009

(54) ELECTRIC DISCHARGE MACHINING APPARATUS

(75) Inventors: Hidetaka Miyake, Tokyo (JP); Takayuki Nakagawa, Tokyo (JP); Yoshihito Imai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 248 days.

(21) Appl. No.: 10/579,831

(22) PCT Filed: Jan. 23, 2004

(86) PCT No.: PCT/JP2004/000600

§ 371 (c)(1),
(2), (4) Date: May 17, 2006

(87) PCT Pub. No.: WO2005/070600

PCT Pub. Date: Aug. 4, 2005

(65) Prior Publication Data

US 2007/0102402 A1    May 10, 2007

(51) Int. Cl.
*B23H 1/04*    (2006.01)
*B23H 7/26*    (2006.01)
*B23H 9/14*    (2006.01)

(52) U.S. Cl. .................. 219/69.2; 219/69.15

(58) Field of Classification Search ............. 219/69.15, 219/69.17, 69.2, 69.12
See application file for complete search history.

(56) References Cited

U.S. PATENT DOCUMENTS

| | | | |
|---|---|---|---|
| 4,782,203 A | 11/1988 | Check et al. | |
| 6,211,480 B1 | 4/2001 | Nagata | |
| 6,390,349 B1 * | 5/2002 | Valenzuela | 226/97.4 |
| 6,403,910 B1 | 6/2002 | Stang et al. | |
| 6,448,528 B1 | 9/2002 | Yoshida | |
| 6,698,639 B1 * | 3/2004 | Otomo et al. | 219/69.12 |
| 2002/0190031 A1 * | 12/2002 | Hall | 219/69.2 |
| 2003/0080094 A1 | 5/2003 | Imai et al. | |
| 2005/0016965 A1 | 1/2005 | Miyake et al. | |
| 2005/0077269 A1 * | 4/2005 | Yokomichi | 219/69.2 |

FOREIGN PATENT DOCUMENTS

| | | |
|---|---|---|
| CN | 1374898 | 10/2002 |
| EP | 0 286 779 | 10/1988 |
| EP | 0 826 455 | 3/1998 |
| GB | 2 376 203 A | 12/2002 |
| JP | 60-217020 A * | 10/1985 |
| JP | 61-164731 A * | 7/1986 |
| JP | 1-11728 | 1/1989 |
| JP | 1-15468 | 5/1989 |
| JP | 2-39825 | 3/1990 |

(Continued)

*Primary Examiner*—Geoffrey S Evans
(74) *Attorney, Agent, or Firm*—Leydig, Voit & Mayer, Ltd.

(57) ABSTRACT

An electric discharge machining apparatus includes a guide electrode that is tubular and receives a small-diameter wire electrode for electric discharge machining. The small-diameter wire electrode can freely slide within the guide electrode. A guide electrode holder holds the guide electrode at a specified position. Pressurized fluid is supplied into the guide electrode to feed the small-diameter wire electrode from the guide electrode. A small-diameter wire electrode holder automatically releases and grasps the small-diameter wire electrode in response to starting and stopping of the pressurized fluid supply, respectively.

14 Claims, 7 Drawing Sheets

FOREIGN PATENT DOCUMENTS

| | | |
|---|---|---|
| JP | 4-41129 | 2/1992 |
| JP | 6-143043 A * | 5/1994 |
| JP | 08-290332 | 11/1996 |
| JP | 2000-301417 | 10/2000 |
| JP | 2001-038532 | 2/2001 |

* cited by examiner

ELECTRIC DISCHARGE MACHINING APPARATUS

TECHNICAL FIELD

The present invention relates to an electric discharge machining apparatus that makes a hole in a workpiece to be machined and, in particular, to an electric discharge machining apparatus that is suitable for use in making a fine hole in a workpiece to be machined by means of electric discharge machining using a small-diameter wire as an electrode.

BACKGROUND ART

Generally, in this kind of electric discharge machining apparatus, an electrode for machining and a workpiece to be machined are arranged in machining liquid and voltage is applied therebetween them to develop electric discharge to make a hole in the workpiece to be machined by electric discharge machining. In order to make a hole of a desired shape while keeping a stable machining state, the electric discharge machining apparatus is provided with a driving unit for adjusting the position of the electrode for machining or the workpiece to be machined.

A command to the driving unit adjusts the position of the electrode for machining or the workpiece to be machined according to the deviation of an inter-electrode voltage, which expresses the relative position of the electrode for machining to the workpiece to be machined, from a target value of this inter-electrode voltage to thereby control the position so as to realize a stable machining state. However, the machining state of the workpiece to be machined by means of the electrode for machining may fluctuate irregularly. Hence, in order to keep the machining state stably, the high-speed responsivity of an XYZ driving unit that controls and drives the electrode for machining in directions of X-axis, Y-axis, and Z-axis to position the electrode for machining becomes important.

Then, in a conventional electric discharge machining apparatus provided with the XYZ driving unit, there has been already known an apparatus that is so constructed as to drive the electrode for machining in a radial direction and in a thrust direction in a non-contact manner by electric magnets in order to improve the high-speed responsivity of the XYZ driving unit to thereby achieve the high-speed responsivity in the directions of the X axis, the Y axis, and the Z axis of the electrode for machining, thereby being able to realize the enhancement of the speed of machining and the enhancement of the accuracy of machining (for example, refer to patent document 1).

Moreover, as another conventional example has been already known an electric discharge machining apparatus having a construction in which: the upper end of a pipe electrode is held by an electrode holder; the electrode holder is chucked by a chuck fixed to the tip of main shaft of a machining machine; and the pipe electrode consumed and shortened by electric discharge machining can be replaced together with the electrode holder; and the pipe electrode held by the electrode holder is made longer, thereby being able to respond to a long time machining (for example, refer to patent document 2).

Further, as an electric discharge machining apparatus according to another conventional example has been already known an apparatus having a construction in which: a small-diameter wire electrode fed out from an electrode supply reel as electrode feeding means is pressed and pinched by two rollers (feeding roller and clamping roller); and one of the rollers is rotated and driven by a servomotor to thereby feed the small-diameter wire electrode continuously (for example, refer to patent document 3).

Still further, as another electrode feeding means of this kind has been already known means having a construction in which a small-diameter wire electrode is pinched by two rollers and is fed out by the amount of consumption by rotating these rollers by a manual operation (for example, refer to patent document 4).

[Patent document 1] International Publication No. WO 02/024389 A1 (page 12 to 15, FIG. 1, FIG. 2)

[Patent document 2] JP-A-08-290332 (pages 6 and 7, FIG. 1, FIG. 2)

[Patent document 3] JP-A-20001-38532 (page 5, FIG. 1)

[Patent document 4] European Patent EP 0826455 B1 (page 2, FIG. 1, FIG. 2)

Because the conventional electric discharge machining apparatuses are constructed in the above-mentioned manner, they present the following various problems.

In the electric discharge machining apparatus disclosed in the patent document 1, high-speed responsivity in the directions of the X-axis, Y-axis, and Z-axis can be achieved. However, when electric discharge machining is performed by means of the electric discharge machining apparatus disclosed in the patent document 1 by using, for example, a tungsten small-diameter wire having a diameter of 0.2 mm or less as an electrode for machining, because the electrode of tungsten small-diameter wire is consumed by machining, in order to make a hole of a desired depth, the tungsten small-diameter wire of a length meeting the amount of estimation of consumption needs to be fed out. However, the electric discharge machining apparatus disclosed in the patent document 1 does not describe anything about the function of feeding out the above-mentioned small-diameter wire automatically. Moreover, according to the electric discharge machining apparatus disclosed in the patent document 1, the speed of machining the workpiece to be machined by the electric discharge machining can be increased but it takes time to correct the consumption of small-diameter wire electrode when the small-diameter wire electrode is used. Hence, this raises a problem that in order to shorten total machining time, an automatic supply mechanism of the small-diameter wire electrode is required.

In the electric discharge machining apparatus disclosed in the patent document 2, because a slender low-rigidity pipe electrode having a long length is used, the pipe electrode becomes a kind of spring. When an electrode replacing mechanism for replacing such a pipe electrode and its electrode holder in their entirety is applied to the electric discharge machining apparatus disclosed in the patent document 1, the high-speed-response driving ability of the pipe electrode is impaired. This raises a problem that the sufficient effect of enhancing the speed and accuracy of electric discharge machining can not be expected. Moreover, a new pipe electrode is long in length and hence is large in resistance, but because the pipe electrode is consumed and shortened by the electric discharge machining, the pipe electrode is gradually decreased also in resistance. Hence, even though the electric conditions at the time of electric discharge machining are set at the same settings, a machining current is gradually increased during the electric discharge machining. That is, in the case of making a hole by means of an electric discharge machining apparatus of an electrode replacement type, the diameter of a hole made by the electric discharge machining is small in a state where the pipe electrode is new, but the diameter of the hole is increased as the resistance of the pipe electrode is decreased by consumption at the time of the electric discharge machining. Hence, there is presented a problem that the quality of machining cannot be kept uniformly.

In the electric discharge machining apparatus disclosed in the patent document 3, the rollers pressing and pinching the small-diameter wire electrode are rotated and driven by the servomotor and hence can supply the small-diameter wire electrode automatically and continuously. However, there is a possibility that the small-diameter wire electrode will be deformed, for example, in an ellipsoidal shape by a force that the rollers applies to the small-diameter wire electrode. Moreover, in an apparatus structure like this, the small-diameter wire electrode cannot be rotated during machining and hence the cross-sectional shape of small-diameter electrode deformed as described above becomes the shape of a hole to be machined. Hence, there is presented a problem that it is impossible to make a hole of high circularity.

In the electric discharge machining apparatus disclosed in the patent document 4, the small-diameter wire electrode is fed out by a manual operation and the operation of feeding the small-diameter wire electrode automatically is never described. For this reason, an operator needs to always control a machining state and needs to manually feed out the small-diameter wire electrode by the amount of consumption, which presents a problem that an electric discharge machining apparatus cannot be fully automated. Moreover, because the small-diameter wire electrode applied to this electric discharge machining apparatus has a diameter of 0.1 mm, there is presented a problem that the electric discharge machining of making a fine hole by using a wire having a small diameter not larger than the diameter cannot be continuously performed.

This invention has been made to solve the above-mentioned problems. The object of this invention is to provide a high-reliability electric discharge machining apparatus that: can feed out a small-diameter wire electrode automatically in a short time without deforming the small-diameter wire electrode in electric discharge machining using a hard-to-handle conducting small-diameter wire as an electrode; can prevent the buckling and vibration of a small-diameter wire electrode to be fed out and can perform the electric discharge machining of making a hole of high circularity automatically, continuously, and efficiently; can shorten the time required to replace the small-diameter wire electrode because of consumption to a large extent; and hence can shorten the time required to prepare machining at the time of making a hole by the electric discharge machining and can produce improvements in machining speed and in machining accuracy.

DISCLOSURE OF THE INVENTION

An electric discharge machining apparatus in accordance with this invention includes: a guide electrode that is shaped like a hollow bar and receives a small-diameter wire electrode for electric discharge machining in such a way that the small-diameter wire electrode can freely slide; guide electrode holding means that holds this guide electrode at a specified position; pressurized fluid supply means that injects and supplies pressurized fluid into the guide electrode to feed out the small-diameter wire electrode from inside the guide electrode to an electric discharge machining side; and small-diameter wire electrode holding means that automatically holds the small-diameter wire electrode fed out from the guide electrode.

In this manner, this invention is constructed in such a way that the pressurized fluid is injected and supplied into the guide electrode that is shaped like a hollow bar and receives the small-diameter wire electrode to thereby feed the small-diameter wire electrode from inside the guide electrode to the electric discharge machining side. Hence, this invention produces the effect of being able to feed out the small-diameter wire electrode in the guide electrode automatically in a short time by the injecting force of pressurized fluid supplied into the guide electrode while keeping the shape of small-diameter wire electrode by the guide electrode shaped like a hollow bar without deforming the small-diameter wire electrode to yet be fed out. Moreover, because the small-diameter wire electrode fed out from inside the guide electrode is automatically held by the small-diameter wire electrode holding means, this invention produces the effect of preventing the buckling and vibration of the small-diameter wire electrode fed out from the guide electrode. Further, because the invention includes the small-diameter wire electrode holding means that automatically holds the small-diameter wire electrode fed out from inside the guide electrode as described above, the invention can decrease the amount of protrusion of the small-diameter wire electrode from the small-diameter wire electrode holding means to a workpiece to be machined and hence makes it possible for the small-diameter wire electrode protruding by the decreased amount of protrusion to be harder to buckle and vibrate. Hence, this invention produces the effect of realizing the electric discharge machining of making a hole of high circularity. Still further, since the invention can elongate the length of small-diameter wire electrode received in the guide electrode, the invention can elongate the timing when the small-diameter wire electrode is replaced because of consumption. For this reason, this invention produces the effect of shortening the total time required to replace the small-diameter wire electrode. As described above, this invention has the effect of shortening the time required to prepare machining at the time of performing the electric discharge machining of making a hole and the effect of making improvements in machining speed and in machining accuracy.

BEST MODE FOR CARRYING OUT THE INVENTION

Hereinafter, to describe this invention in more detail, the best embodiment for carrying out this invention will be described with reference to the accompanying drawings.

EMBODIMENT 1

Figure 1:
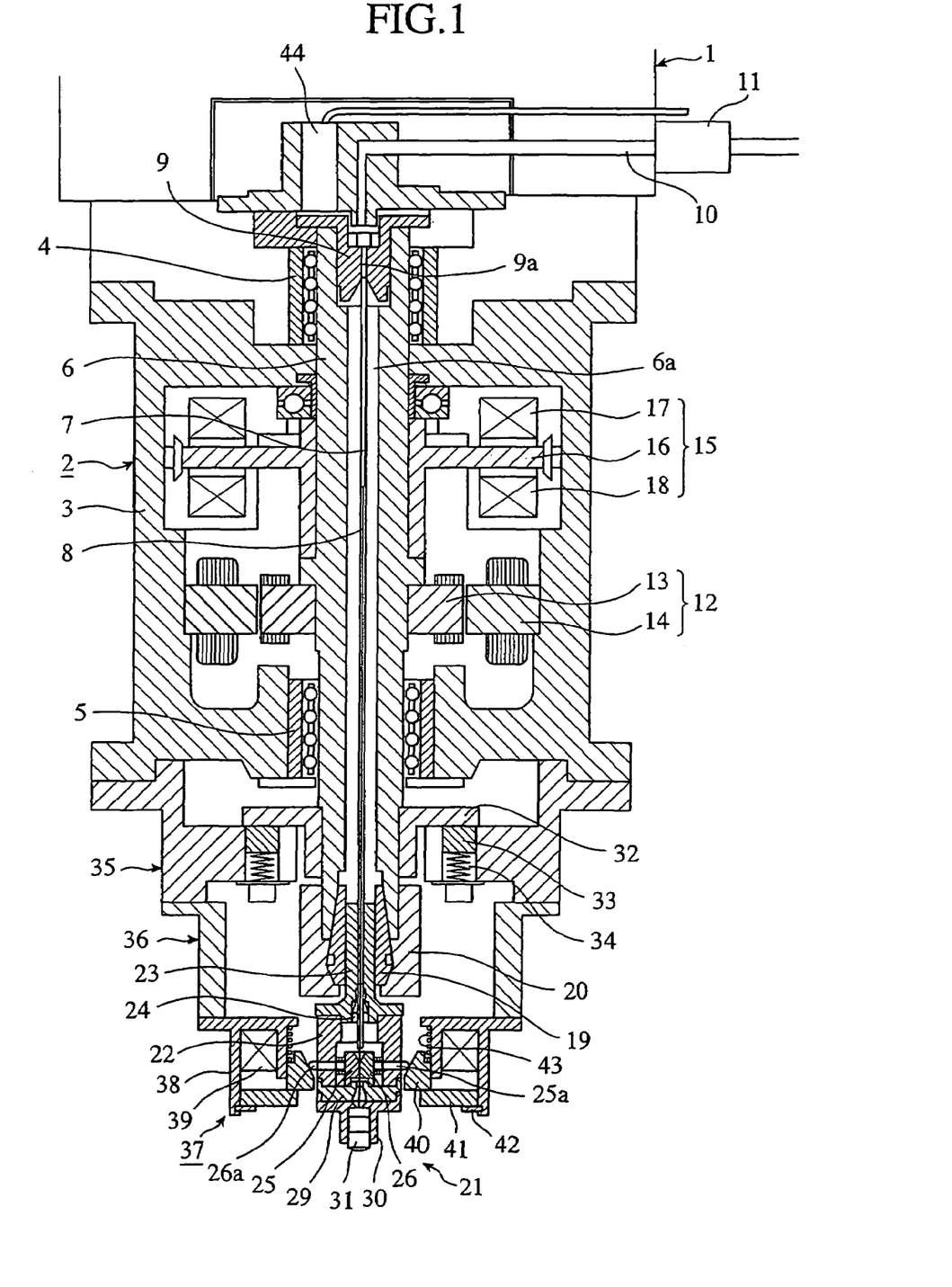
FIG. 1 is a cross-sectional view showing an electric discharge machining apparatus in accordance with embodiment 1 of this invention.
Figure 2:
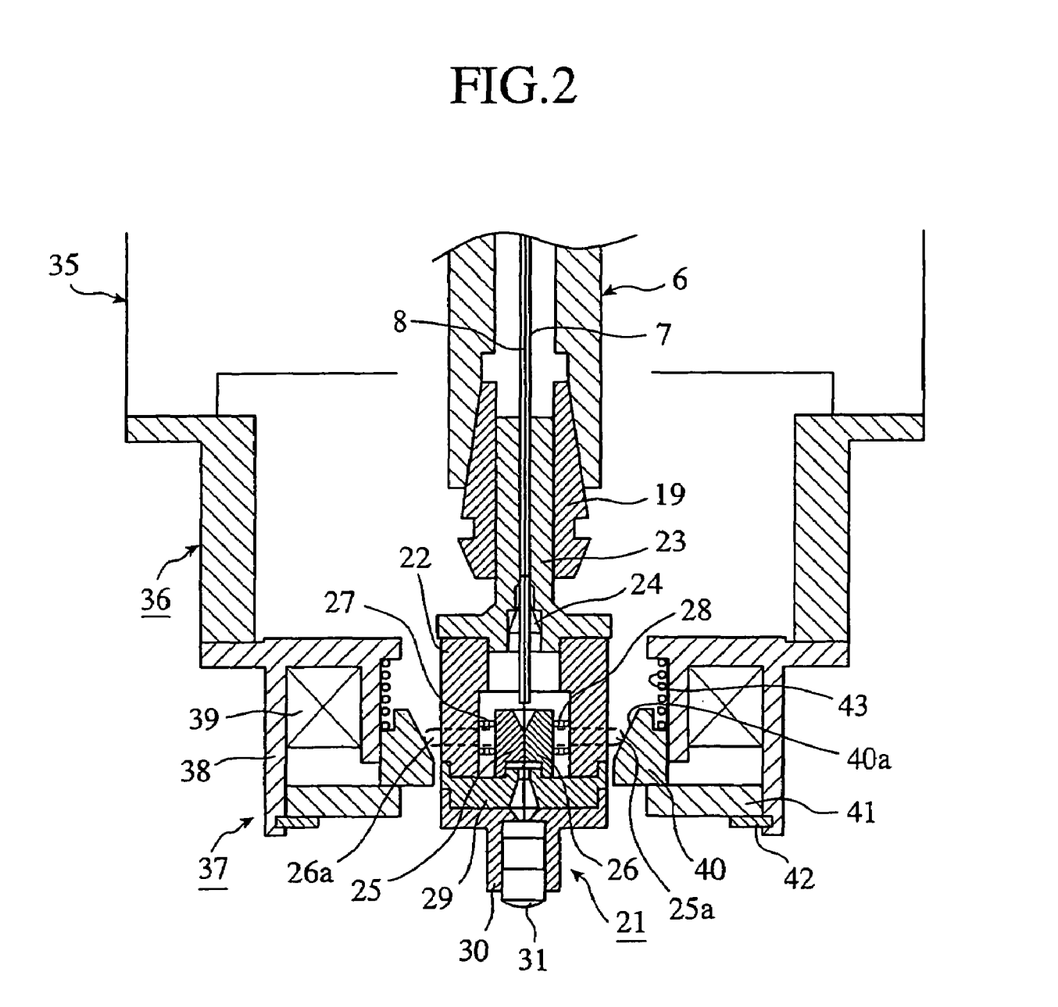
FIG. 2 is an enlarged cross-sectional view of a main portion in FIG. 1.
Figure 3:
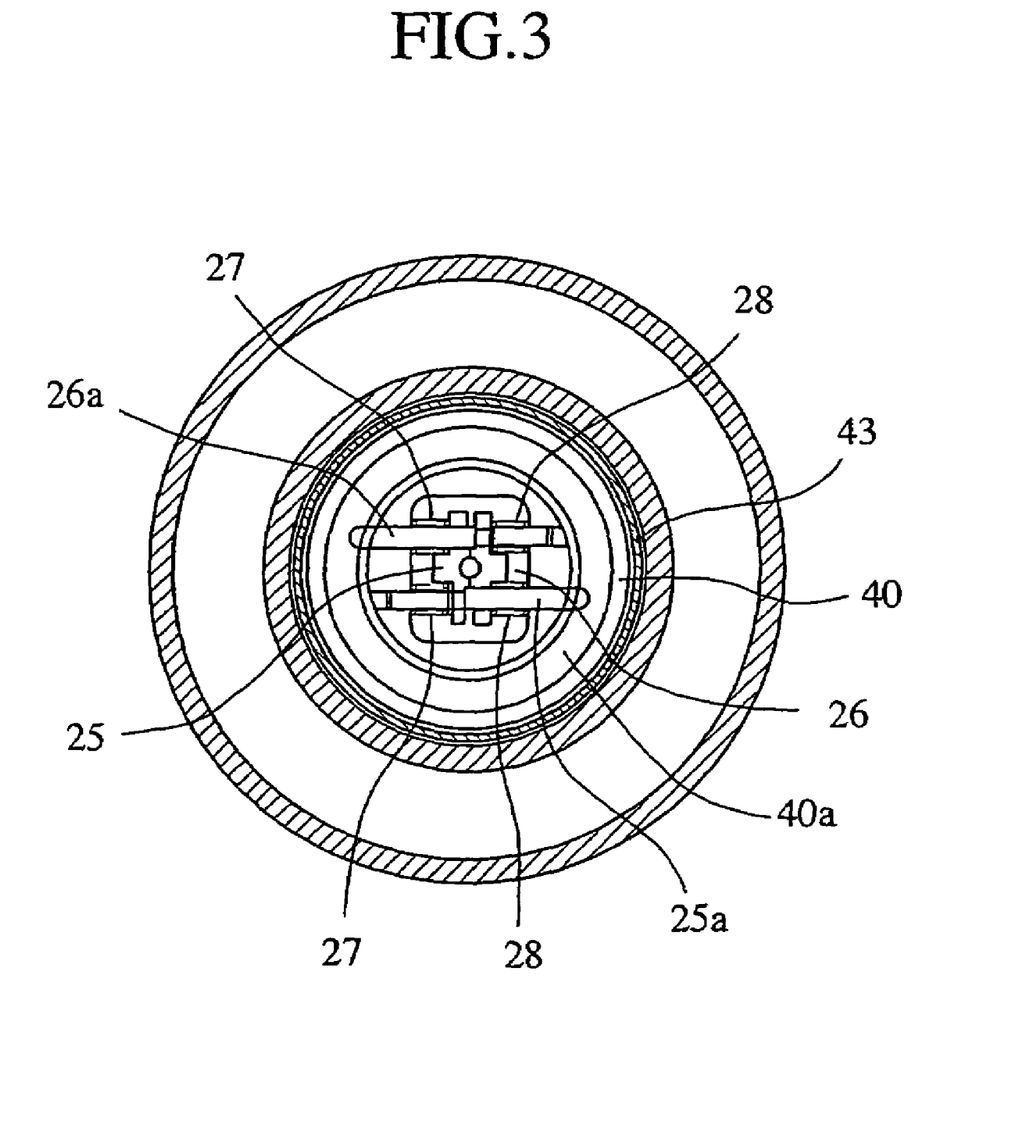
FIG. 3 is a lateral cross-sectional view of a main portion in FIG. 2.

FIG. 1 is a cross-sectional view showing an electric discharge machining apparatus in accordance with embodiment 1 of this invention, FIG. 2 is an enlarged cross-sectional view of a main portion in FIG. 1, and FIG. 3 is a lateral cross-sectional view of a main portion in FIG. 2.

In FIG. 1, the main shaft head 1 of the electric discharge machining apparatus is mounted with an electrode driving unit 2 of high-speed responsivity. This electrode driving unit 2 includes a housing 3 serving as a main body of this unit and a driving shaft 6 mounted in a central portion in this housing 3 in such a way as to be rotatable and movable in an axial direction via upper and lower bearings 4, 5. A bearing such as a rotary sliding bush to allow the driving shaft 6 to move in the axial direction (direction of thrust) is applied as the bearings 4, 5. The driving shaft 6 has a central through hole 6a and has a guide electrode 7 shaped like a hollow bar (shaped like a pipe) inserted into this central through hole 6a. A small-diameter wire electrode 8 for electric discharge machining is slidably inserted into and received in the guide electrode 7. A guide electrode holder (guide electrode holding means) 9 for inserting and holding the upper end of guide electrode 7 in such a way as to be removable is fixed to the upper end of the driving shaft 6. The guide electrode holder 9 has a through hole 9a communicating with the inside of the guide electrode 7. A fluid supply pipe 10 is connected to the through hole 9a, which supplies pressurized fluid such as air or liquid into the guide electrode 7 to feed out the small-diameter wire electrode 8 from inside the guide electrode 7 to an electric discharge machining side. The fluid supply pipe 10 is pressure fluid supplying means that is provided with a solenoid valve 11 and is connected to a fluid supply source.

The driving shaft 6 is rotated and driven by an electric motor (rotating driving means) 12. The electric motor 12 is composed of a rotor 13 fixed to the outer periphery of the driving shaft 6 and a stator 14 that surrounds this rotor 13 and is fixed to the inner wall surface of housing 3. The driving shaft 6 is moved up and down in an axial direction by axial driving means 15. The axial driving means 15 is constructed of: a target disk 16 integrally fitted on the outer periphery of driving shaft 6 at an appropriate distance from the electric motor 12; and a pair of upper and lower electromagnets 17, 18 that are arranged at upper and lower positions sandwiching this target disk 16 and are fixed to the inner wall surface of housing 3. Here, the electromagnets 17, 18 are arranged and fixed at a space to allow the target disk 16 to move up and down and are connected to a current control device (not shown), respectively.

A small-diameter wire electrode holding unit 21 is fixed to the lower end of driving shaft 6 by means of a collet 19 and a nut 20, and the lower end side of guide electrode 7 is fixed by this small-diameter wire electrode holding unit 21. That is, a shank part 23 of the small-diameter wire electrode holding unit (small-diameter wire electrode holding means) 21 is held by the collet 19 fitted in the lower end of driving shaft 6 and the small-diameter wire electrode holding unit 21 is fixed to the lower end of driving shaft 6 by fastening this collet 19 by the nut 20. In this fixing state, the lower end side of guide electrode 7 passes through the shank portion 23 of the small-diameter wire electrode holding unit 21 and faces the inside of the small-diameter wire electrode holding unit 21. Here, the collet 19 and the nut 20 construct guide electrode holding means for holding the lower end side of guide electrode 7 via the shank portion 23.

Next, the detailed construction of small-diameter wire electrode holding unit 21 will be described on the basis of FIG. 2 and FIG. 3.

The small-diameter wire electrode holding unit 21 is provided with: a cylindrical unit case 22; a rubber bush 24 that is fitted in a portion near the root of shank portion 23 integral with this unit case 22 to thereby hold the guide electrode 7; and a pair of small-diameter wire holders 25, 26 arranged opposite to each other at positions where they pinch and hold the small-diameter wire electrode 8 fed out from the lower end of guide electrode 7 in the unit case 22. The small-diameter wire holders 25, 26 integrally have protruding levers (small-diameter wire holder driving levers) 25a, 26a loosely passing through the peripheral wall of unit case 22 outward in the radial direction of unit case 22, respectively. Springs (holder biasing means) 27, 28 for biasing the small-diameter wire holders 25, 26 in a direction to make the jigs abut against each other (in a direction to hold the small-diameter wire electrode 8) are interposed between the inner wall surface of unit case 22 and the respective small-diameter wire holders 25, 26, respectively. Hence, the small-diameter wire holders 25, 26 and the springs 27, 28 construct small-diameter wire electrode holding means for holding the small-diameter wire electrode 8 fed out from the guide electrode 7.

Here, when a moving part 40 provided in a small-diameter wire electrode hold controlling unit 37 (described later) moves up, the protruding levers 25a, 26a of the small-diameter wire holders 25, 26 are pressed by the moving part 40 to thereby separate the small-diameter wire holders 25, 26 from each other against the biasing forces of the springs 27, 28 (to release the hold of the small-diameter wire electrode 8). A stopper 29 against which the lower ends of the small-diameter wire holders 25, 26 abut in a sliding manner is fixed to the lower end of unit case 22. The stopper 29 is a part provided for preventing the small-diameter wire holders 25, 26 from moving extremely to one side and acts as a positioning part for causing the center of small-diameter wire electrode 8 to coincide with the rotational center of the driving shaft 6. A die fixture 30 is removably fixed to the lower end of this stopper 29 and a diamond die 31 is fixed to this die fixture 30 by a set screw. The small-diameter wire electrode 8 is passed through the central hole of this diamond die 31. The diamond die 31 is used for preventing core-vibration of the small-diameter wire electrode 8 when it is rotated.

As shown in FIG. 1, a power supply plate 32 for supplying machining power is fitted on the lower outer periphery of driving shaft 6 between the lower bearing 5 and the collet 19. A power supply brush 33 is pressed onto this power supply plate 32 by a coil spring 34. The power supply brush 33 and the coil spring 34 become machining power supply means and are combined with and set in a plain annular coupling part 35 fixed to the lower end of housing 3 and are connected to a power source for electric discharge machining (not shown). A jig 36 is fixed to the lower end of coupling part 35 and a small-diameter wire electrode hold controlling unit 37 is fixed to the lower end of this jig 36.

The small-diameter wire electrode hold controlling unit 37 is provided with: a solenoid body 38 fixed to the lower end of the jig 36; a solenoid 39 combined with this solenoid body 38; the plane annular moving part 40 fitted inside the solenoid body 38 so as to freely move up and down; and a target 41 arranged at the lower end of the solenoid body 38 and held by a stopper 42. The target 41 is made of a plane annular magnetic body and can be moved up and down. The inside radial surface of the moving part 40 is formed in a tapered surface 40a (refer to FIG. 2) shaped like a mortar of which the diameter gradually increases toward an upper end side. The tips of protruding levers 25a, 26a of small-diameter wire holders 25, 26 abut against the tapered surface 40a. The abutting state is always kept by the biasing forces of springs 27, 28 of small-diameter wire holders 25, 26. The moving part 40 is always biased in a down direction by a coil spring 43 to be thereby held on the target 41. Hence, the stopper 42 prevents the target 41 and the moving part 40 from dropping after they are released from attraction by the solenoid 39.

In the above construction, it is preferable that a copper pipe having an outside diameter of approximately 1 mm, an inside diameter of approximately 0.5 mm, and a length by approximately 10 mm to 20 mm longer than the total length of the driving shaft 6 and collet 19 fitted in the driving shaft 6 is used as the guide electrode 7. When the small-diameter wire electrode 8 inserted into this guide electrode 7 is as long as or shorter than the guide electrode 7, it is easy to do a preparatory work at the time of the electric discharge machining of making a hole. Each of tops of opposite abutting surfaces of small-diameter wire holders 25, 26, as shown in FIG. 1 and FIG. 2, is formed in a tapered shape to easily introduce the small-diameter wire electrode 8 from above between the small-diameter wire holders 25, 26. The constituent parts of small-diameter wire holders 25, 26 and their protruding levers 25a, 26a, and small-diameter wire electrode holding unit 21 are formed of a conducting material such as steel. With this, the power for machining supplied to the driving shaft 6 is supplied to the small-diameter wire electrode 8.

As shown in FIG. 1, a cap sensor 44 is arranged on the upper end of driving shaft 6. This cap sensor 44 is connected to a current value control device (not shown). The electric motor 15, the electromagnets 17, 18 of the axial driving means 16 system, power source for electric discharge machining (not shown) of the power supply brush 33 system, and the solenoid 39 of small-diameter wire electrode hold controlling unit 37 system are connected to the current value control device, respectively. These are controlled by the current value control device so as to respond in relation to each other.

Next, the operation will be described below.

When the upper and lower electromagnets 17, 18 are respectively energized, the upper and lower electromagnets 17, 18 develop electromagnetic attracting forces to attract the target disk 16 between the both. At this time, the values of currents supplied to the respective electromagnets 17, 18 are controlled to appropriate values by the current value control device. This current value control is performed by causing a difference between the values of currents supplied to one electromagnet 17 and the other electromagnet 18. A large difference is caused in the electromagnetic attracting force between the two electromagnets 17, 18 by increasing the difference between the values of currents. For this reason, the target disk 16 interposed between the electromagnets 17, 18 is moved up or down toward the electromagnet 17 or the electromagnet 18 that has a larger electromagnetic attracting force. By performing such current value control at high speed, the target disk 16 is operated in an upward or downward direction at high response speed, whereby the driving shaft 6 and the small-diameter wire electrode holding unit 21 are driven together with the target disk 16 in the same direction at high response speed. The driving shaft 6 and the small-diameter wire electrode holding unit 21 are driven together at high speed by starting the electric motor 12. In the aforementioned manner, the electrode driving unit 2 achieves high-speed response driving of the small-diameter wire electrode holding unit 21 in the vertical direction, and high-speed rotation driving of the small-diameter wire electrode holding unit 21.

Next, an explanation will be given of the operation of feeding out the small-diameter wire electrode 8 inserted into and received in the guide electrode 7.

To feed out the small-diameter wire electrode 8, first, hold of small-diameter wire electrode 8 by the small-diameter wire holders 25, 26 is released. This release of the hold is performed by supplying power to the solenoid 39 of small-diameter wire electrode hold controlling unit 37. That is, when the solenoid 39 is energized, the target 41 is attracted and moved up by the solenoid 39 to push up the moving part 40. At this time, the protruding levers 25a, 26a of the small-diameter wire holders 25, 26 are pressed in by the tapered surface 40a of the moving part 40 in opposite directions (into the unit case 22) against biasing forces by the springs 27, 28. This pressing-in opens the respective clamping surfaces of small-diameter wire holders 25, 26 to release the hold of the small-diameter wire electrode 8 by these small-diameter wire holders 25, 26.

In the hold-releasing state, by opening a solenoid valve 11 of the fluid supply pipe 10 system, pressurized fluid such as air is injected into the guide electrode 7 from the fluid supply pipe 10 and the small-diameter wire electrode 8 in the guide electrode 7 is pushed out by this injecting force. The injection of pressurized fluid into the guide electrode 7 may be performed continuously but may be performed intermittently so as to finely adjust the amount of feed of small-diameter wire electrode 8. When the driving shaft 6 and the small-diameter wire electrode holding unit 21 are driven at high response speed by the electrode driving unit 2 at the time of pushing out the small-diameter wire electrode 8 by the pressurized fluid as described above, the small-diameter wire electrode 8 is prevented from being caught on the inside surface of guide electrode 7 because of friction between them, thereby being fed out more easily.

The small-diameter wire electrode 8 pushed out from the tip of the guide electrode 7 by the pressurized fluid is protruded from the diamond die 31. When the injection of pressurized fluid is stopped, the operation of feeding out the small-diameter wire electrode 8 is also stopped. After the operation of feeding out the small-diameter wire electrode 8 is stopped, the small-diameter wire electrode 8 is automatically clamped by the small-diameter wire holders 25, 26. That is, when the operation of feeding out the small-diameter wire electrode 8 is stopped, the supply of current to the solenoid 39 of the small-diameter wire electrode hold controlling unit 37 system is stopped at that time to bring the electromagnetic attracting force of the target 41 by the solenoid 39 to zero, whereby the moving part 40 and the target 41 are pressed down by the biasing force of coil spring 43.

When the moving part 40 is pressed down, the points where the protruding levers 25a, 26a of the small-diameter wire holders 25, 26 abut against the tapered surface 40a of moving part 40 move from a small-diameter side of the tapered surface 40a to a large-diameter side thereof to gradually decrease a pressing force onto the protruding levers 25a, 26a by the tapered surface 40a, whereby the respective small-diameter wire holders 25, 26 are closed by the biasing force of the springs 27, 28 to again hold the small-diameter wire electrode 8 fed out from inside the guide electrode 7.

As described above, when the following operation steps of: releasing the hold of small-diameter wire electrode 8; injecting the pressurized fluid; pushing out the small-diameter wire electrode 8; stopping the injection of pressurizing fluid; and again holding the small-diameter wire electrode 8 are repeatedly performed, the small-diameter wire electrode 8 is brought in due time into contact with the surface of a workpiece to be machined that is placed ahead. At this time, the contact of small-diameter wire electrode 8 with the surface of the workpiece to be machined is detected by a contact detection function (contact detection sensor) that the electric discharge machining apparatus includes as standard equipment and its contact detection signal is sent to a small-diameter wire feed control device (not shown). When this small-diameter wire feed control device has the contact detection signal inputted thereto, it closes the solenoid valve 11. With this, the supply of pressurized fluid into the guide electrode 7 is stopped and hence the operation of feeding out the small-diameter wire electrode 8 is stopped. At this time, the amount of feed of the small-diameter wire electrode 8 can be adjusted by a distance to the workpiece to be machined before the start of operation of feeding out the small-diameter wire electrode 8. After the operation of feeding out the small-diameter wire electrode 8 is finished, the driving shaft 6 and the small-diameter wire electrode holding unit 21 are rotated and driven at high speed to perform the electric discharge machining of making a hole in the workpiece to be machined by using the small-diameter wire electrode 8.

Even if the small-diameter wire electrode holding unit 21 stops rotating so as to feed out the small-diameter wire electrode 8 and hence the protruding levers 25a, 26a of the small-diameter wire holders 25, 26 stop at arbitrary positions on the tapered surface 40a of the moving part 40, because each of the solenoid 39, the target 41, and the moving part 40 of small-diameter wire electrode hold controlling unit 37 system is plane and annular, the protruding levers 25a, 26a of the small-diameter wire holders 25, 26 to clamp and unclamp the small-diameter wire electrode 8 as described above can be operated.

Next, an explanation will be given of replacement of the small-diameter wire electrode 8 upon the wearing out.

First, the die fixture 30 is dismounted together with the stopper 29 from the unit case 22 of small-diameter wire electrode holding unit 21. Next, the whole guide electrode 7 including the small-diameter wire electrode 8 is dismounted and then the small-diameter wire electrode 8 is replaced. In this case, the small-diameter wire holders 25, 26 need to be separated from each other wider than when the target 41 is attracted by the solenoid 39 of small-diameter wire electrode hold controlling unit 37 system (when the small-diameter wire holders 25, 26 release the clamping of the small-diameter wire electrode 8). Hence, only the moving part 40 is manually lifted more than the upward stroke of target 41 by the attraction of solenoid 39. With this, the space between the opposite surfaces of small-diameter wire holders 25, 26 is widened to a space to allow the guide electrode 7 to pass. Then, the guide electrode 7 and the small-diameter wire electrode 8 are withdrawn together and then the small-diameter wire electrode 8 is replaced with a new one. At the time of this replacement, as described above, in a state where the moving part 40 is lifted and where the space between the small-diameter wire holders 25, 26 is widened, the guide electrode 7 having a new small-diameter wire electrode 8 inserted thereinto is inserted from below between the small-diameter wire holders 25, 26 into the central through hole 6a of driving shaft 6 via the central hole portions of the rubber bush 24 in the shank portion 23 and the shank portion 23. Then, the upper end of guide electrode 7 is inserted into the through hole 9a of guide electrode holder 9, thereby being connected to the guide electrode holder 9. Thereafter, the lifting of moving part 40 is released and then the die fixture 30 and the stopper 29 are together combined with the lower end of unit case 22. In this manner, the operation of replacing the small-diameter wire electrode 8 is finished.

According to the embodiment 1 described above, the pressurized fluid is injected into the guide electrode 7 that is shaped like a hollow bar and receives the small-diameter wire electrode 8 in such a way that the small-diameter wire electrode 8 can freely slide. Hence, the embodiment 1 produces the effect of being able to feed out the small-diameter wire electrode 8 in the guide electrode 7 automatically in a short time to the electric discharge machining side by the injecting force of pressurized fluid while preventing the small-diameter wire electrode 8 from being bent and deformed by the guide electrode 7. When the small-diameter wire electrode 8 is fed out in this manner, the solenoid 39 of small-diameter wire electrode hold controlling unit 37 system is excited (operated) and the solenoid valve 11 of pressurized fluid supply system is controlled so as to open in response to the excitement of solenoid 39, whereby the pressurized fluid is injected into the guide electrode 7 in a state where the hold of small-diameter wire electrode 8 by the small-diameter wire holders 25, 26 are released. Hence, the embodiment 1 produces the effect of being able to realize the automatic feed of the small-diameter wire electrode 8 by the injecting force. When the small-diameter wire electrode 8 fed out from the inside of the guide electrode 7 is passed through the central hole of diamond die 31 and is put into contact with the surface of the workpiece to be machined, the solenoid valve 11 of the pressurized fluid supply system is closed by a sensor signal to detect this contact and the solenoid 39 of the small-diameter wire electrode hold controlling unit 37 system is released from being excited (stopped from operating) in response to this. With this, the moving part 40 is moved down by the biasing force of coil spring 43 and the small-diameter wire holders 25, 26 are closed by the biasing forces of springs 27, 28 to surely hold the small-diameter wire electrode 8 fed out from inside the guide electrode 7 to thereby prevent the buckling and vibration of the fed-out small-diameter wire electrode B. Therefore, the embodiment 1 produces the effect of being able to perform the electric discharge machining of making a hole of high circularity.

Moreover, according to the above-mentioned embodiment 1, when the small-diameter wire electrode 8 is fed out, the upper electromagnet 17 and the lower electromagnet 18 of the axial driving means 15 are alternately excited and hence the guide electrode 7 can be finely vibrated in the axial direction together with the driving shaft 6 via the target disk 16 to prevent the small-diameter wire electrode 8 during the delivery from being caught on the inner wall surface of the guide electrode 7 by the friction with that surface or the like. Hence, embodiment 1 produces the effect of being able to feed out the small-diameter wire electrode 8 stably and rapidly. Furthermore, the small-diameter wire electrode 8 fed out from the inside of the guide electrode 7 can be held by the small-diameter wire holders 25, 26 so as to be coaxial with the rotational center of driving shaft 6 and can be rotated and driven together with the driving shaft 6 in this state at high speed. Hence, embodiment 1 produces the effect of being able to realize the electric discharge machining of making a hole of high circularity.

Further, according to the above-mentioned embodiment 1, the amount of protrusion of small-diameter wire electrode 8 from the small-diameter wire electrode holding unit 21 to the workpiece to be machined can be made short by the small-diameter wire electrode holding unit 21 and hence the small-diameter wire electrode 8 of this small amount of protrusion is harder to buckle and vibrate, which results in preventing the high-response-speed driving of the small-diameter wire electrode 8 from being damaged at the time of performing the electric discharge machining of making a hole by using the high-response-speed electrode driving unit 2. Hence, embodiment 1 produces the effect of being able to realize the electric discharge machining of making a hole of higher circularity at high speed and with high accuracy. Still further, since the small-diameter wire electrode 8 received in the guide electrode 7 can be made long, the timing when the small-diameter wire electrode 8 needs to be replaced because of consumption, of small-diameter wire electrode 8 can be elongated. Hence, embodiment 1 produces the effect of being able to shorten the total time required to replace the small-diameter wire electrode 8. In addition, when the moving part 40 is lifted manually against the biasing force of coil spring 43 at the time of replacing the small-diameter wire electrode 8, the protruding levers 25a, 26a of small-diameter wire holders 25, 26 are pushed by the tapered surface 40a of moving part 40, whereby the small-diameter wire holders 25, 26 can be opened significantly against the biasing forces of springs 27, 28. Hence, embodiment 1 produces the effect of being able to withdraw the small-diameter wire electrode 8 together with the guide electrode 7 and to replace the small-diameter wire electrode 8 with ease.

Still further, according to the above-mentioned embodiment 1, the driving shaft 6 having the guide electrode 7 inserted thereinto, the guide electrode 7, the small-diameter wire electrode holding unit 21 are rotated and driven in synchronization with each other. Hence, the driving shaft 6 and the small-diameter wire electrode 8 can be rotated and driven together at high speed in a state where the center of small-diameter wire electrode 8 is brought in line with the rotational center of driving shaft 6 to thereby prevent the high-response speed driving of the small-diameter wire electrode 8 from being damaged at the time of performing the electric discharge machining of making a hole by using the high-response-speed electrode driving unit 2. Hence, embodiment 1 produces the effect of being able to realize the electric discharge machining of making a hole at high speed with high accuracy.

Still further, according to the above-mentioned embodiment 1, when the pressurized fluid is supplied into the interior of the guide electrode 7, the small-diameter wire electrode holding unit 21 is moved in response to the supply in a direction to release the hold of small-diameter wire electrode 8, and when the supply of the pressurized fluid into the guide electrode 7 is stopped, the small-diameter wire electrode holding unit 21 is moved in response to the stop in a direction to hold the small-diameter wire electrode 8. Hence, the automatic feed of the small-diameter wire electrode 8 can be smoothly performed by the injecting force of pressurized fluid supplied into the guide electrode 7. Therefore, embodiment 1 produces the effect of being able to realize the automatic feed of small-diameter wire electrode 8 and the automatic hold/release of the hold of the small-diameter wire electrode 8 of the small-diameter wire electrode 8 by a response operation relating to the automatic feed.

Still further, according to the above-mentioned embodiment 1, as described above, the pair of small-diameter wire holders 25, 26 arranged in a direction to hold and release the hold of the small-diameter wire electrode 8 fed out from inside the guide electrode 7 are driven in a direction to release the hold of small-diameter wire electrode 8 by the moving part 40 attracted and moved by the solenoid 39 operated when the pressurized fluid is supplied into the guide electrode 7, and when the supply of pressurized fluid into the guide electrode 7 is stopped, the small-diameter wire holders 25, 26 are driven in a direction to hold the small-diameter wire electrode 8 by the biasing force of holder biasing means (springs) 27, 28. Hence, embodiment 1 produces an effect that when the supply of pressurized fluid into the guide electrode 7 is performed and when the supply is stopped, the small-diameter wire holding jigs 25, 26 can be driven instantaneously in response thereto.

Still further, according to the above-mentioned embodiment 1, the power for electric discharge machining is supplied to the small-diameter wire electrode 8 held by the small-diameter wire holders 25, 26 of the small-diameter wire electrode holding unit 21 via the small-diameter wire electrode holding unit 21 and hence the length of small-diameter wire electrode 8 from a position, at which the power for electric discharge machining is supplied to the small-diameter wire electrode 8, to the tip of small-diameter wire electrode 8 can be made constant, whereby the resistance of small-diameter wire electrode 8 becomes constant. Hence, the embodiment 1 produces the effect of being able to eliminate variations in discharge current during making a hole and to realize the stable electric discharge machining of making a hole and to improve the accuracy and quality of machining to a large degree.

Still further, according to this invention, the driving shaft 6 can be finely vibrated in the axial direction as described above during the feeding-out of small-diameter wire electrode 8 from inside the guide electrode 7 and hence the small-diameter wire electrode 8 during delivery can be prevented by the vibration from being caught on the inner wall of guide electrode 7 because of friction or the like. Hence, the embodiment 1 produces the effect of being able to perform the automatic feed-out of small-diameter wire electrode 8 stably and rapidly.

EMBODIMENT 2

Figure 4:
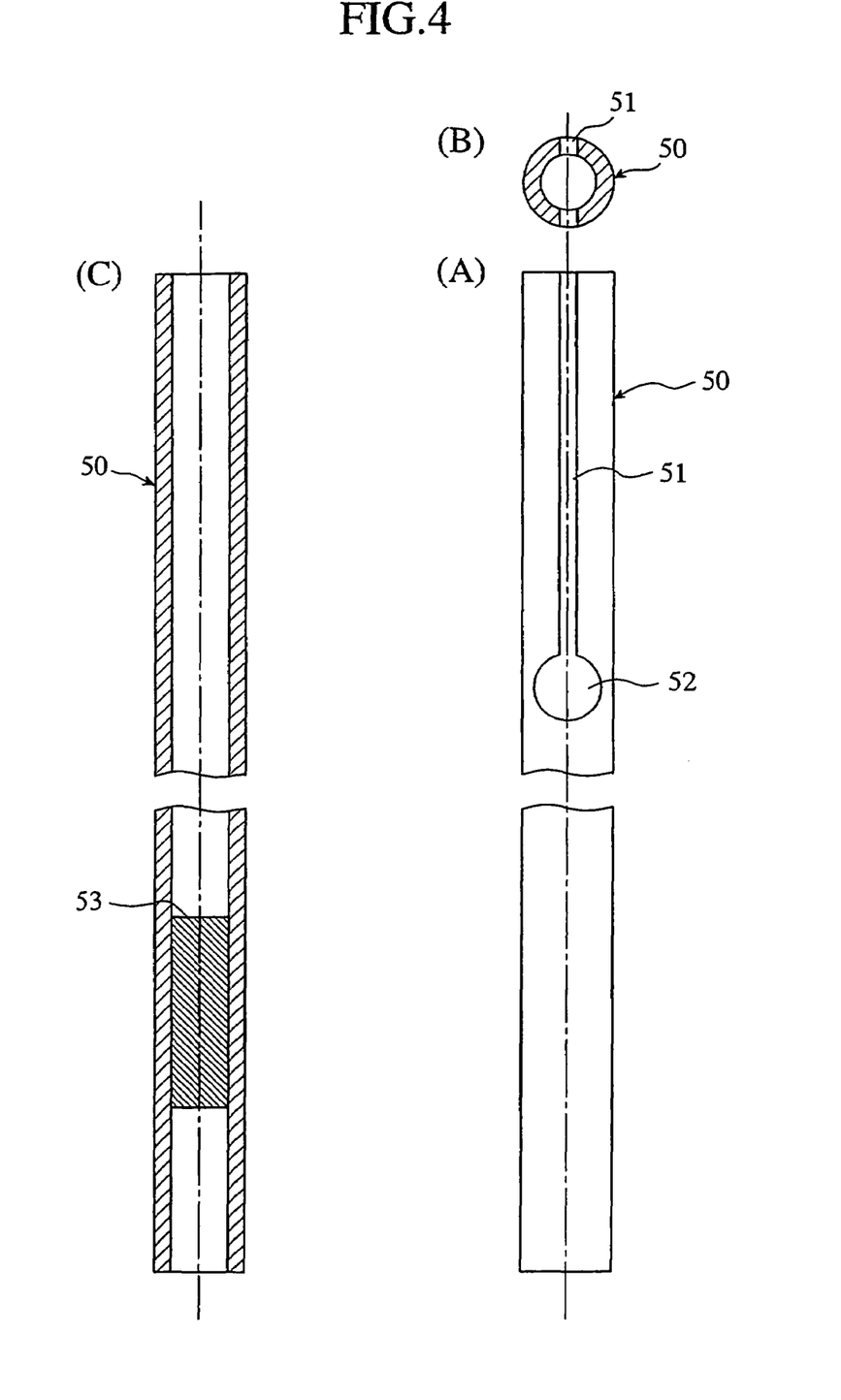
FIG. 4(A) is a front view showing a guide electrode inserting jig in accordance with embodiment 2 of this invention.
FIG. 4(B) is a cross-sectional view in a radial direction in FIG. 4(A)
FIG. 4(C) is a cross-sectional view in an axial direction in FIG. 4(A).

FIG. 4(A) is a front view showing a guide electrode inserting jig in accordance with embodiment 2 of this invention, and FIG. 4(B) is a cross-sectional view in a radial direction in FIG. 4(A), and FIG. 4(C) is a cross-sectional view in an axial direction in FIG. 4(A).

A guide electrode inserting jig 50 in accordance with this embodiment 2 is such that is used in the case of loading the small-diameter wire electrode 8 and the guide electrode 7 into the small-diameter wire electrode holding unit 21 of the electric discharge machining apparatus in accordance with the above-mentioned embodiment 1. That is, in the electric discharge machining apparatus of the above-mentioned embodiment 1, in order to pass the guide electrode 7 through the rubber bush 24 in the small-diameter wire electrode holding unit 21 and to insert the guide electrode 7 into the central through hole 6a of driving shaft 6 and to insert and retain the guide electrode 7 into and by the upper guide electrode holder 9, the guide electrode 7 needs to be pressed in. For the purpose of performing this pressing-in work with ease, the guide electrode inserting jig 50 in accordance with this embodiment 2 is used.

This guide electrode inserting jig 50 is formed in a circular hollow bar-shaped having a diameter smaller than the diameter of guide electrode 7 to be inserted, for example, by 0.11 mm to 0.5 mm and has at least two parallel axial grooves 51 incised in a length of approximately 10 mm from its one end and has circular holes 52 formed in the base portions of these axial grooves 51. The guide electrode inserting jig 50 shaped like such a circular hollow bar is provided integrally with a blind plug 53 in a portion close to the other end.

Next, the operation will be described below.

The guide electrode 7 receiving the small-diameter wire electrode 8 is pressed into the guide electrode inserting jig 50 from its opening on the axial groove 51 side. At this time, even if the outside diameter of the guide electrode 7 is larger than the inside diameter of the guide electrode inserting jig 50, because the guide electrode inserting jig 50 has the axial grooves 51 and the circular holes 52 formed therein as described above, the guide electrode 8 can be chucked by the guide electrode inserting jig 50. Then, in the same way as in the above-mentioned embodiment 1, the small-diameter wire holders 25, 26 in the small-diameter wire electrode holding unit 21 are widened and in this state, the guide electrode inserting jig 50 is pressed into the central through hole 6a of driving shaft 6 together with the guide electrode 7 from below via the rubber bush 24 to insert the guide electrode 7 protruding from the guide electrode inserting jig.50 into the upper guide electrode holder 9. Then, when the guide electrode inserting jig 50 is withdrawn after this insertion, the mounting and setting of guide electrode 7 is finished.

If the small-diameter wire electrode 8 having been mounted and set is replaced when it is consumed by the electric discharge machining, the guide electrode 7 needs to be dismounted. In this case, only the guide electrode inserting jig 50 is pressed from its opening end on the axial groove 51 side into the small-diameter wire electrode holding unit 21 to fit the inside of tip of pressed-in guide electrode inserting jig 50 on the guide electrode 7 and then the guide electrode inserting jig 50 is pulled out, whereby the guide electrode 7 can be withdrawn together with the small-diameter wire electrode 8. The blind plug 53 in the guide electrode inserting jig 50 functions as a stopper that abuts against and supports the inserted tip of guide electrode 7 when the guide electrode 7 having an outside diameter smaller than the inside diameter of guide electrode inserting jig 50 is inserted.

According to the above-mentioned embodiment 2, this produces the effect of being able to easily do the work of inserting the guide electrode 7 into the small-diameter wire electrode holding unit 21 and the driving shaft 6 and the work of withdrawing the guide electrode 7 at the time of replacing the small-diameter wire electrode 8 because of consumption of small-diameter wire electrode 8 in the electric discharge machining apparatus in accordance with the above-mentioned embodiment 1. In particular, since the guide electrode inserting jig 50 has the axial grooves 51 formed therein, the embodiment 2 produces an effect that even if the diameter of guide electrode 7 is larger than the inside diameter of guide electrode inserting jig 50, the guide electrode 7 can be pressed into and chucked by the guide electrode inserting jig 50. Moreover, since the blind plug 53 is set in the guide electrode inserting jig 50, the embodiment 2 produces an effect that even if the diameter of guide electrode 7 is smaller than the inside diameter of guide electrode inserting jig 50, in a state where this guide electrode 7 is inserted in the guide electrode inserting jig 50, the work of inserting or withdrawing the guide electrode 7 into or from the small-diameter wire electrode holding unit 21 and the driving shaft 6, as described above, can be easily performed by the guide electrode inserting jig 50.

EMBODIMENT 3

Figure 5:
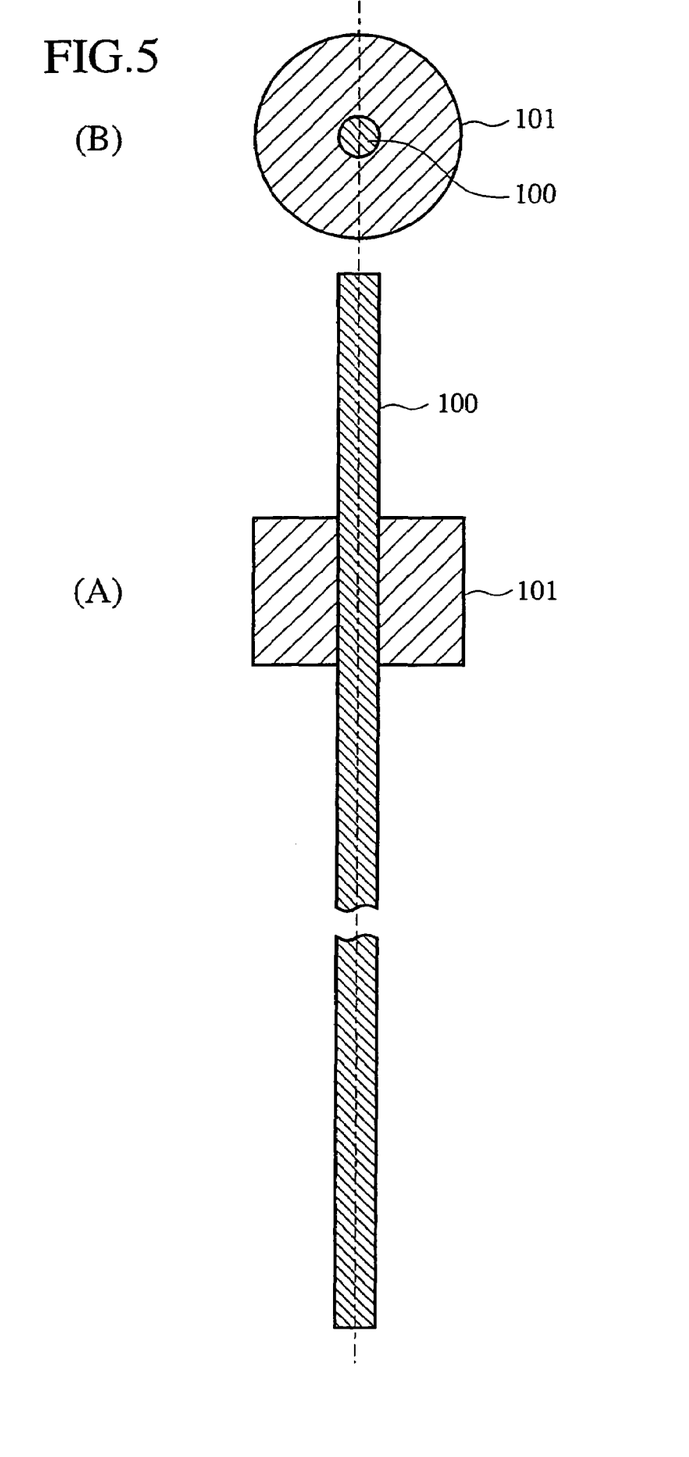
FIG. 5(A) is a cross-sectional view, in an axial direction, showing a guide electrode inserting jig in accordance with embodiment 3 of this invention.
FIG. 5(B) is a cross-sectional view in a radial direction in FIG. 5(A).

FIG. 5(A) is a cross-sectional view, in an axial direction, showing a guide electrode inserting jig in accordance with embodiment 3 of this invention, and FIG. 5(B) is a cross-sectional view in a radial direction in FIG. 5(A).

A guide electrode inserting jig 100 in accordance with this embodiment 3 is such that is used in the case of loading the small-diameter wire electrode 8 and the guide electrode 7 into the small-diameter wire electrode holding unit 21 of the electric discharge machining apparatus in accordance with the above-mentioned embodiment 1. That is, in the electric discharge machining apparatus of the above-mentioned embodiment 1, in order to pass the guide electrode 7 through the rubber bush 24 in the small-diameter wire electrode holding unit 21 and then to insert the guide electrode 7 into the central through hole 6a of driving shaft 6 to thereby insert and retain the guide electrode 7 into and by the upper guide electrode holder 9, the guide electrode 7 needs to be pressed in. For the purpose of performing this pressing-in work with ease, the guide electrode inserting jig 100 in accordance with this embodiment 3 is employed.

This guide electrode inserting jig 100 is formed of a circular solid bar having a diameter nearly equal to the diameter of guide electrode 7 to be inserted, that is, a diameter of a size that does not allow the guide electrode inserting jig 100 to be inserted into the guide electrode 7, and is so constructed as to have a block 101 shaped like a circular solid body of a diameter larger than the diameter of this solid bar integrally fixed in a middle portion on the outer periphery of this solid bar.

A position where the block 101 is fixed to the guide electrode inserting jig 100 is set at a position, for example, approximately 14 mm away from the tip of guide electrode inserting jig 100 abutting against the lower end of guide electrode 7. That is, the position where the block 101 is fixed to the guide electrode inserting jig 100 is set in such a way that, in the process of pressing the guide electrode 7 from below the small-diameter wire holders 25, 26 into the central through hole 6a of driving shaft 6, by making the tip of guide electrode inserting jig 100 abut against the lower end of guide electrode 7 and then by pressing the guide electrode 7 into the central through hole 6a, as shown in FIG. 1, when the upper end of guide electrode 7 is inserted into and held by the through hole 9a of upper guide electrode holder 9, the block 101 abuts against the stopper 29 of the small-diameter wire electrode holding unit 21 to make the amount of pressing-in of guide electrode 7 optimum. Moreover, the block 101 is formed in the shape of a circular solid body having a diameter, for example, approximately three times the diameter of guide electrode inserting jig 100.

Next, the operation will be described below.

In the same manner as in the case of replacing the small-diameter wire electrode 8 in the above-mentioned embodiment 1, the small-diameter wire holders 25, 26 in the small-diameter wire electrode holding unit 21 having the die fixture 30 removed therefrom are widened and in this state, the guide electrode 7 is pressed from below into the central through hole 6a of driving shaft 6 via the rubber bush 24. At this time, to completely press the guide electrode 7 inward further than the small-diameter wire holders 25, 26, the guide electrode inserting jig 100 is used. In this case, the tip of guide electrode inserting jig 100 is made to abut against the lower end of guide electrode 7 and then is pressed into the central through hole 6a. With this, when the block 101 of guide electrode inserting jig 100 abuts against the stopper 29 of the small-diameter wire holding unit 21, the upper end of guide electrode 7 pressed into the central through hole 6a is inserted into and held by the upper guide electrode holder 9 and hence by withdrawing the guide electrode inserting jig 100 when the block 101 abuts against the stopper 29, the operation of mounting and setting the guide electrode 7 is finished.

When the small-diameter wire electrode 8 inserted into and set in the guide electrode 7 is replaced when it is consumed by the electric discharge machining, the guide electrode 7 needs to be dismounted. In this case, the guide electrode inserting jig 50 in accordance the above-mentioned embodiment 2 may be used, but if a guide electrode withdrawing jig of embodiment 5 that is improved from the guide electrode inserting jig 50 (described later) is employed, the operation of withdrawing and replacing the guide electrode 7 can be more easily.

According to the above-mentioned embodiment 3, the block 101 formed of the circular solid body having a diameter larger than the diameter of guide electrode inserting jig 100 formed of a circular solid bar having a diameter that does not allow the bar to be inserted into the guide electrode 7 is fixed integrally with the middle portion on the outer periphery of the jig 100. In the process of inserting the guide electrode 7 into the central through hole 6a of driving shaft 6, by causing the tip of guide electrode inserting jig 100 to abut against the lower end of guide electrode 7 and then by pressing the guide electrode 7 into the central through hole 6a, the block 101 abuts against the stopper 29 of the small-diameter wire electrode holding unit 21 and the upper end of guide electrode 7 is inserted into and held by the upper guide electrode holder 9. Hence, the embodiment 3 produces an effect that only by causing the block 101 to abut against the stopper 29 at the time of pressing the guide electrode 7 by the guide electrode inserting jig 100, the operation of inserting the guide electrode 7 can be performed easily without resort to a skilled operator and uniformly without pressing the guide electrode 7 excessively or deficiently.

EMBODIMENT 4

While the block 101 is integrally mounted on the guide electrode inserting jig 100 in the above-mentioned embodiment 3, the block 101 may be screwed on the outer periphery of guide electrode inserting jig 100. In this case, in the process of inserting the guide electrode 7 in the central through hole 6a of driving shaft 6, by causing the tip of guide electrode inserting jig 100 to abut against the lower end of guide electrode 7 and then by pressing the guide electrode 7 in the central through hole 6a, the position of block 101 can be easily adjusted so that the block 101 surely abuts against the stopper 29 of small-diameter wire electrode holding unit 21 when the upper end of guide electrode 7 is inserted in and held by the upper guide electrode holder 9. Hence, embodiment 4 produces the effect of being able to easily manufacture the guide electrode inserting jig 100 provided with the block 101.

EMBODIMENT 5

Figure 6:
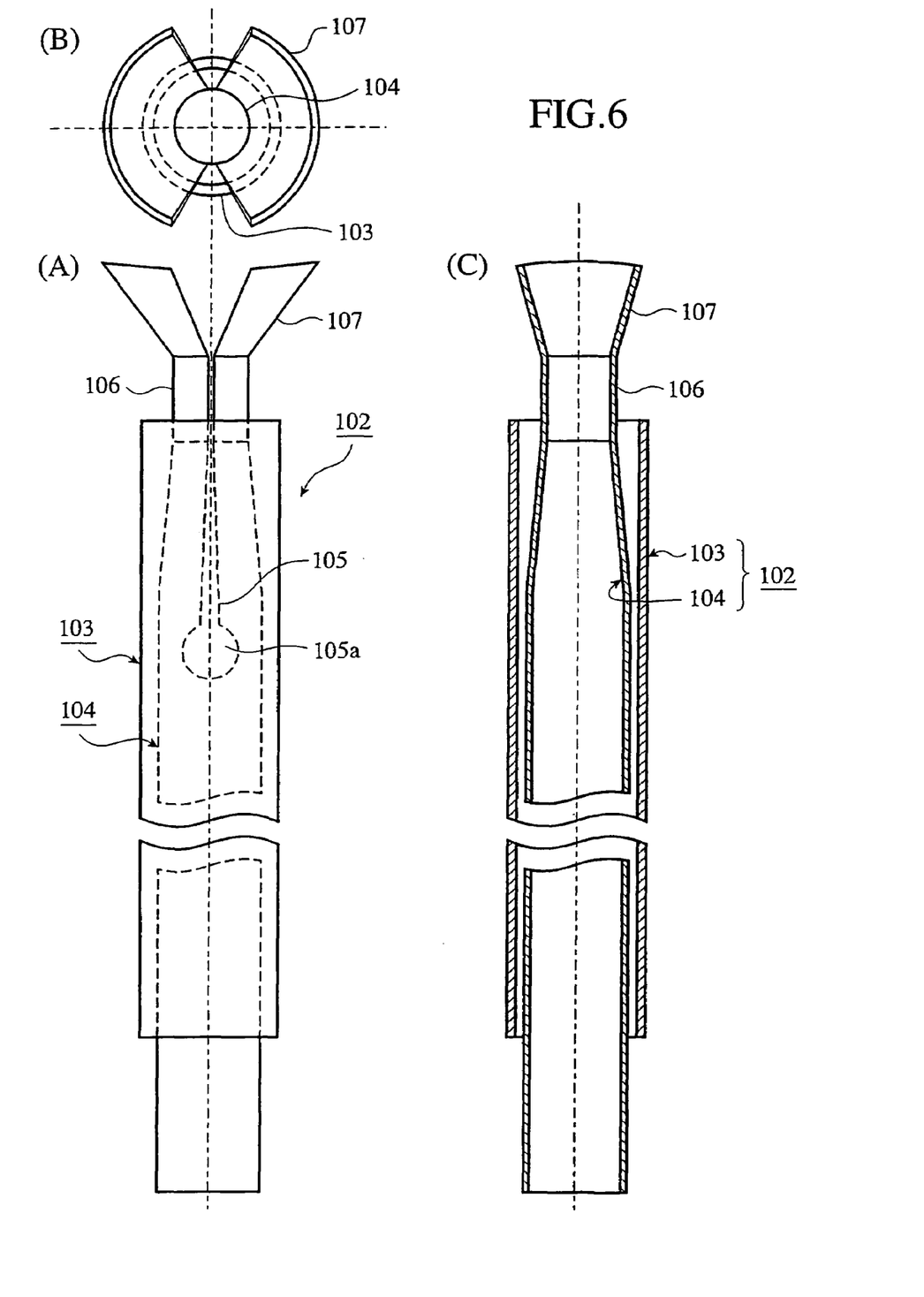
FIG. 6(A) is a front view showing a guide electrode withdrawing jig in accordance with embodiment 5 of this invention.
FIG. 6(B) is a plan view in FIG. 6(A)
FIG. 6(C) is a cross-sectional view in an axial direction in FIG. 6(A).

FIG. 6(A) is a front view showing a guide electrode withdrawing jig in accordance with embodiment 5 of this invention, and FIG. 6(B) is a plan view in FIG. 6(A), and FIG. 4(C) is a cross-sectional view in an axial direction in FIG. 6(A).

A guide electrode withdrawing jig 102 in accordance with this embodiment 5 is constructed of an outside circular hollow bar (hereinafter referred to as "outside hollow bar") 103 and an inside circular hollow bar (hereinafter referred to as "inside hollow bar") 104 that is inserted into the outside hollow bar 103 so as to freely slide in the axial direction. Here, the inside hollow bar 104 is so formed as to have an inside diameter smaller than the diameter of guide electrode 7 to be withdrawn, for example, by approximately 0.1 mm to 0.5 mm, and the outside hollow bar 103 is so formed as to have an inside diameter larger than the diameter (outside diameter) of inside hollow bar 104, for example, by approximately 0.1 mm to 0.5 mm.

The inside hollow bar 104 has at least two parallel axial grooves 105 of a length of approximately 10 mm incised from its one end and is bent so that the width of axial groove 105 becomes narrower from a circular hole 105a made in the base portion of axial groove 105 toward its tip. A neck portion 106 in which the axial groove 105 is parallel is formed on the tip end side of inside hollow bar 104. This neck portion 106 is formed in parallel to the axial direction in a length of approximately 1.1 mm from a position approximately 6 mm away from the circular hole 105a made in the base portion of axial groove 105 toward its tip. Moreover, the neck portion 106 is bent on its tip end side so as to expand the axial groove 105 to form an expanding portion 107. This expanding portion 107 is tapered so that its diameter gradually increases from the inside diameter of outside hollow bar 103 to the tip side.

Next, the operation will be described below.

When the guide electrode 7 shown in FIG. 1 and FIG. 2 is withdrawn, first, in the same manner as in the case of replacing the small-diameter wire electrode 8 in the embodiment 1, the small-diameter wire holders 25, 26 in the small-diameter wire electrode holding unit 21 having the die fixture 30 removed are widened and then the guide electrode withdrawing jig 102 is pressed from below into the space between these small-diameter wire holders 25, 26. Then, the lower end side of guide electrode 7 held by the rubber bush 24 in the small-diameter wire electrode holding unit 21 is fitted in the neck portion 106 of inside hollow bar 104 of guide electrode withdrawing jig 102, whereby the tip of inside hollow bar 104 abuts against the bottom surface of shank portion 23 of small-diameter wire electrode holding unit 21. When the outside hollow bar 103 of guide electrode withdrawing jig 102 is further pressed into in this state, the expanding portion 107 of inside hollow bar 104 is fitted in the outside hollow bar 103 and is moved in a direction to narrow its diameter (in a direction to narrow the axial groove 105) to narrow the neck portion 106, whereby the lower end of guide electrode 7 fitted in this neck portion 106 is chucked. In this chucking state, the expanding portion 107 of inside hollow bar 104 is narrowed in diameter and is brought into a state where it is pressed in and held by the outside hollow bar 103. Hence, by pulling out the guide electrode withdrawing jig 102 in this state, the guide electrode 7 can be withdrawn together with the small-diameter electrode 8.

According to the above-mentioned embodiment 5, the guide electrode withdrawing jig 102 is constructed as follows: the neck portion 106 in which the axial groove 105 is parallel is integrally formed on one end side of the inside hollow bar 104 having the axial groove 105; the expanding portion 107 that can be expanded and contracted in the radial direction is integrally formed on the tip side of this neck portion 106; and when the inside hollow bar 104 is inserted into the outside hollow bar 103 so as to freely slide and the outside hollow bar 103 is moved in the axial direction with respect to the inside hollow bar 104, the neck portion 106 is expanded and contracted in the radial direction via the expanding portion 107. Hence, only by withdrawing the guide electrode withdrawing jig 102 after pressing-in the outside hollow bar 103 in a state where the lower end of guide electrode 7 is fitted at least in the neck portion 106 in the inside hollow bar 104, the guide electrode 7 can be withdrawn together with the small-diameter electrode 8. For this reason, in the electric discharge machining apparatus in accordance with the embodiment 1, embodiment 5 produces the effect of being able to do the work of withdrawing the guide electrode 7 easily and smoothly at the time of replacing the small-diameter wire electrode 8 because of the consumption of small-diameter wire electrode 8.

EMBODIMENT 6

Figure 7:
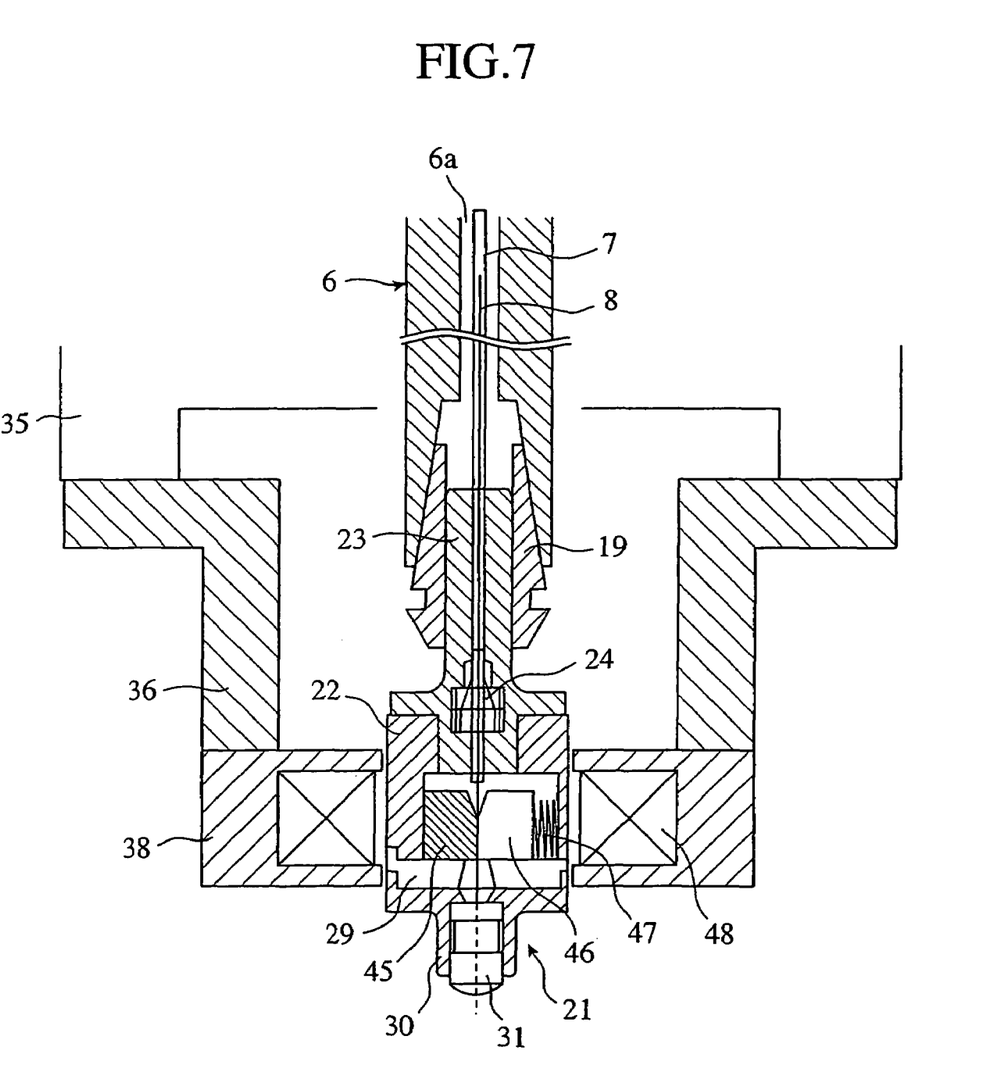
FIG. 7 is a sectional view showing a main portion of an electric discharge machining apparatus in accordance with embodiment 6 of this invention.

FIG. 7 is a sectional view showing a main portion of an electric discharge machining apparatus in accordance with embodiment 6 of this invention. The same constituent elements as those in FIG. 1 to FIG. 3 are denoted by the same reference symbols and their duplicate descriptions will be omitted.

In this embodiment 6, as small-diameter wire electrode holding means for pinching and holding the small-diameter wire electrode 8 fed out from the guide electrode 7, a permanent magnet 45 and a magnetic small-diameter wire holder 46 are arranged opposite to each other at a position where the small-diameter wire electrode 8 fed out from the guide electrode 7 is pinched. The permanent magnet 45 is fixed to the inside wall surface of unit case 22 of the small-diameter wire electrode holding unit 21. The small-diameter wire holder 46 is held on the stopper 29 of lower end of the unit case 22 in such a way as to be able to move in the direction in which small-diameter wire holder 46 comes into contact with and separates from the permanent magnet 45. The small-diameter wire holder 46 is biased in a direction to come in contact with the permanent magnet 45 by a back spring (holder biasing means) 47 that is connected to its back surface and is interposed between the back surface and the inside wall surface of unit case 22. Moreover, a solenoid 48 is arranged below the jig 36 in the high-response-speed electrode driving unit 2 in such a way as to produce a small gap (approximately 2 mm) between itself and the small-diameter wire holder 46 and its solenoid body 38 is fixed to the lower end of jig 36. The solenoid 48 is such that separates the small-diameter wire holder 46 from the permanent magnet 45 against the biasing force of back spring 47 by a magnetic attracting force developed when the solenoid 48 is excited.

Next, the operation will be described below.

When pressurized fluid is supplied into the guide electrode 7 (when the solenoid valve 11 in FIG. 1 is opened), the solenoid 48 is excited in response to the supply and the small-diameter wire holder 46 is separated from the permanent magnet 45 against the biasing force of back spring 47 by the magnetic attracting force developed at this time. In this state, the small-diameter wire electrode 8 is fed out from inside the guide electrode 7 by the pressurized fluid. When the supply of pressurized fluid into the guide electrode 7 is stopped, that is, when the solenoid valve 11 is closed, the exciting of solenoid 48 is stopped. Then, the small-diameter wire holder 46 is attracted to the permanent magnet 45 by the magnetic force of permanent magnet 45 and the biasing force of back spring 47 of small-diameter wire holder 46, whereby the small-diameter wire electrode 8 fed out from the guide electrode 7 is pinched and held between the permanent magnet 45 and the small-diameter wire holder 46.

According to the above-mentioned embodiment 6, the permanent magnet 45 and the small-diameter wire holder 46 are arranged opposite to each other at a position where the small-diameter wire holder 46 fed out from inside the guide electrode 7 is pinched. In this arrangement, the permanent magnet 45 is fixed at that position and the small-diameter wire holder 46 can be moved in the direction in which the small-diameter wire holder 46 comes into contact with and separates from the permanent magnet 45. When the pressurized fluid is supplied into the guide electrode 7, the small-diameter wire holder 46 is separated from the permanent magnet 45 by the magnetic attracting force of the solenoid 48 activated in response to the supply of pressurized fluid. With this, when the small-diameter wire electrode 8 is fed out by the injecting force of pressurized fluid supplied into the guide electrode 7, the small-diameter wire holder 46 is separated from the permanent magnet 45. For this reason, the embodiment 6 produces the effect of being able to realize the smooth and automatic feed of small-diameter wire electrode 8 by the injecting force of pressurized fluid. Moreover, when the supply of pressurized fluid into the guide electrode 7 is stopped, the solenoid 48 stops operating in response to this and hence the permanent magnet 45 attracts the small-diameter wire holder 46. Hence, the embodiment 6 produces the effect of being able to reliably hold the small-diameter wire electrode 8 fed out from inside the guide electrode 7 by the permanent magnet 45 and the small-diameter wire holder 46. In addition, the embodiment 6 produces the effect of being able to cause the permanent magnet 45 to attract the small-diameter wire holder 46 reliably by the biasing force of back spring 47 and of being able to hold the small-diameter wire electrode 8 strongly by the biasing force of back spring 47 and the magnetic force of permanent magnet 45 when the exciting of the solenoid 48 is stopped.

INDUSTRIAL APPLICABILITY

As described above, the electric discharge machining apparatus in accordance with this invention is applicable to the electric discharge machining of making a fine hole in the workpiece to be machined by using a small-diameter wire as an electrode.

The invention claimed is:

1. An electric discharge machining apparatus for making a hole in a workpiece, using a small-diameter wire as an electrode, while rotating the electrode, by electric discharge between the electrode and the workpiece in a machining liquid, the apparatus comprising:
   a tubular guide electrode that slidably receives a small-diameter wire electrode for electric discharge machining;
   guide electrode holding means for holding the guide electrode at a specified position;
   pressurized fluid supply means for injecting and supplying a pressurized fluid distinct from the machining liquid into the guide electrode to feed the small-diameter wire electrode out of the guide electrode into the machining liquid for electric discharge machining; and
   small-diameter wire electrode holding means automatically releasing and grasping the small-diameter wire electrode in response to starting and stopping of supplying of the pressurized fluid into the guide electrode, respectively.

2. The electric discharge machining apparatus according to claim 1, including a hollow driving shaft in which the guide electrode is located and is held so that the guide electrode rotates with the driving shaft, wherein the small-diameter wire electrode holding means is fixed to the driving shaft and rotates with the driving shaft.

3. The electric discharge machining apparatus according to claim 1, wherein,
   when the pressurized fluid is supplied into the guide electrode, the small-diameter wire electrode holding means moves, in response to the pressurized fluid, in a direction to release the small-diameter wire electrode, and
   when supply of the pressurized fluid into the guide electrode is stopped, the small-diameter wire electrode holding means moves, in response to stopping of the pressurized fluid, in a direction to grasp the small-diameter wire electrode.

4. The electric discharge machining apparatus according to claim 1, wherein the small-diameter wire electrode holding means includes:
   a pair of small-diameter wire holders movable in a first direction to grasp the small-diameter wire electrode fed from the guide electrode and in a second direction to release the small-diameter wire electrode;

holder biasing means that biases the pair of small-diameter wire holders toward the first direction;

a moving part movable along a direction to feed the small-diameter wire electrode; and a solenoid attracting and moving the moving part when the pressurized fluid is supplied into the guide electrode, wherein, when the pressurized fluid is supplied into the guide electrode, the moving part is attracted and moved by the solenoid so that the pair of small-diameter wire holders move in the second direction to release the small-diameter wire electrode, against a biasing force applied by the holder biasing means, and when supply of the pressurized fluid into the guide electrode is stopped, the small-diameter wire holders move in the first direction and grasp the small-diameter wire electrode with the biasing force applied by the holder biasing means.

5. The electric discharge machining apparatus according to claim 1, wherein the small-diameter wire electrode holding means includes:

a permanent magnet arranged along the small-diameter wire electrode fed from the guide electrode;

a magnetic small-diameter wire holder arranged opposite the permanent magnet and movable in a first direction to pinch the small-diameter wire electrode between the magnetic small-diameter wire holder and the permanent magnet, to grasp the small-diameter wire electrode, and in a second direction to release the small-diameter wire electrode; and a solenoid that attracts and moves the magnetic small-diameter wire holder in the first direction to separate the small-diameter wire holder from the permanent magnet when the pressurized fluid is supplied into the guide electrode.

6. The electric discharge machining apparatus according to claim 1, wherein power for electric discharge machining is supplied to the small-diameter wire electrode via the small-diameter wire electrode holding means.

7. The electric discharge machining apparatus according to claim 1, wherein a vibrating force is applied to the guide electrode when the small-diameter wire electrode is fed from the guide electrode.

8. An electric discharge machining apparatus for making a hole in a workpiece, using a small-diameter wire as an electrode, while rotating the electrode, by electric discharge between the electrode and the workpiece in a machining liquid, the apparatus comprising:

a tubular guide electrode that slidably receives a small-diameter wire electrode for electric discharge machining;

guide electrode holding means for holding the guide electrode at a specified position;

pressurized fluid supply means for injecting and supplying a pressurized fluid distinct from the machining liquid into the guide electrode to feed the small-diameter wire electrode out of the guide electrode into the machining liquid for electric discharge machining; and small-diameter wire electrode holding means releasing and grasping the small-diameter wire electrode upon starting and stopping of supplying the pressurized fluid into the guide electrode, respectively, in response to a feeding control signal, wherein the small-diameter wire electrode holding means comprises a solenoid, responsive to the feeding control signal, that attracts a part of the small-diameter wire electrode holding means when the pressurized fluid is supplied to the guide electrode.

9. The electric discharge machining apparatus according to claim 8, including a hollow driving shaft in which the guide electrode is located and is held so that the guide electrode rotates with the driving shaft, wherein the small-diameter wire electrode holding means is fixed to the driving shaft and rotates with the driving shaft.

10. The electric discharge machining apparatus according to claim 8, wherein, the part of the small-diameter wire electrode holding means is attracted, upon injecting of the pressurized fluid, in a direction to release the small-diameter wire electrode, and the part of the small-diameter wire electrode holding means is released, upon stopping of the injecting of pressurized fluid, in a direction to grasp the small-diameter wire electrode.

11. The electric discharge machining apparatus according to claim 8, wherein the small-diameter wire electrode holding means includes:

a pair of small-diameter wire holders movable in a first direction to grasp the small-diameter wire electrode fed from the guide electrode and in a second direction to release the small-diameter wire electrode;

holder biasing means that biases the pair of small-diameter wire holders toward the first direction; and a moving part movable along a direction to feed the small-diameter wire electrode wherein when the pressurized fluid is supplied into the guide electrode, the moving part is attracted and moved by the solenoid so that the pair of small-diameter wire holders move in the second direction to release the small-diameter wire electrode, against a biasing force applied by the holder biasing means, and when supply of the pressurized fluid into the guide electrode is stopped, the small-diameter wire holders move in the first direction and grasp the small-diameter wire electrode with the biasing force applied by the holder biasing means.

12. The electric discharge machining apparatus according to claim 8, wherein the small-diameter wire electrode holding means includes:

a permanent magnet arranged along the small-diameter wire electrode fed from the guide electrode; and a magnetic small-diameter wire holder arranged opposite the permanent magnet and movable in a first direction to pinch the small-diameter wire electrode between the magnetic small-diameter wire holder and the permanent magnet, to grasp the small-diameter wire electrode, and in a second direction to release the small-diameter wire electrode, wherein the solenoid attracts and moves the magnetic small-diameter diameter wire holder in the first direction to separate the small-diameter wire holder from the permanent magnet when the pressurized fluid is supplied into the guide electrode.

13. The electric discharge machining apparatus according to claim 8, wherein power for electric discharge machining is supplied to the small-diameter wire electrode via the small-diameter wire electrode holding means.

14. The electric discharge machining apparatus according to claim 8, wherein a vibrating force is applied to the guide electrode when the small-diameter wire electrode is fed from the guide electrode.

* * * * *